(No Model.) 2 Sheets—Sheet 1.

J. M. HERING.
FARMING MACHINE.

No. 428,721. Patented May 27, 1890.

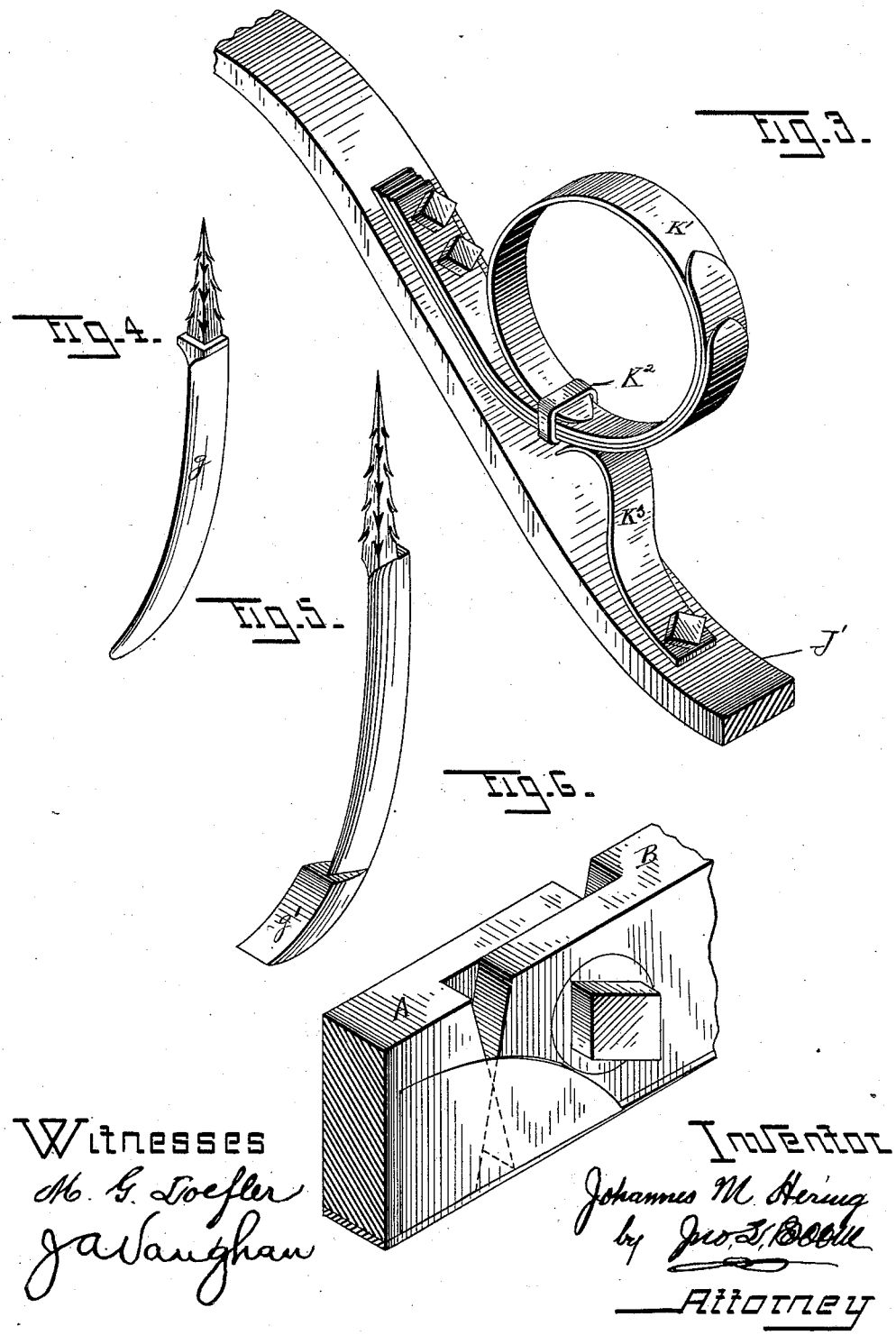

UNITED STATES PATENT OFFICE.

JOHANNES MORITZ HERING, OF HONOLULU, SANDWICH ISLANDS.

FARMING-MACHINE.

SPECIFICATION forming part of Letters Patent No. 428,721, dated May 27, 1890.

Application filed April 11, 1889. Serial No. 306,843. (No model.)

*To all whom it may concern:*

Be it known that I, JOHANNES MORITZ HERING, of Honolulu, Sandwich Islands, have invented an Improved Farming-Machine; and I do hereby declare that the following is a full, clear, and exact description thereof.

My invention relates to a combined digging, subsoiling, pulverizing, planting, and harrowing machine. The mechanism by which these several operations are accomplished is mounted in a continuous sectional frame-work, so that they successively operate upon the soil in a single passage of the machine over the ground to be prepared and planted, leaving the ground thoroughly cultivated and planted as the machine moves along over it. The machine is also provided with hampers and chests for carrying seeds, tools, cooking utensils, and provisions, and with a suitable frame-work for sustaining a canopy or cover, by which it can be converted into a comfortable tent or living-house, in which are suspended hammocks for sleeping purposes, the object of my invention being to provide a complete farming-machine adapted to the large western farms, where accommodations are distant from the ground to be worked.

Figure 1:
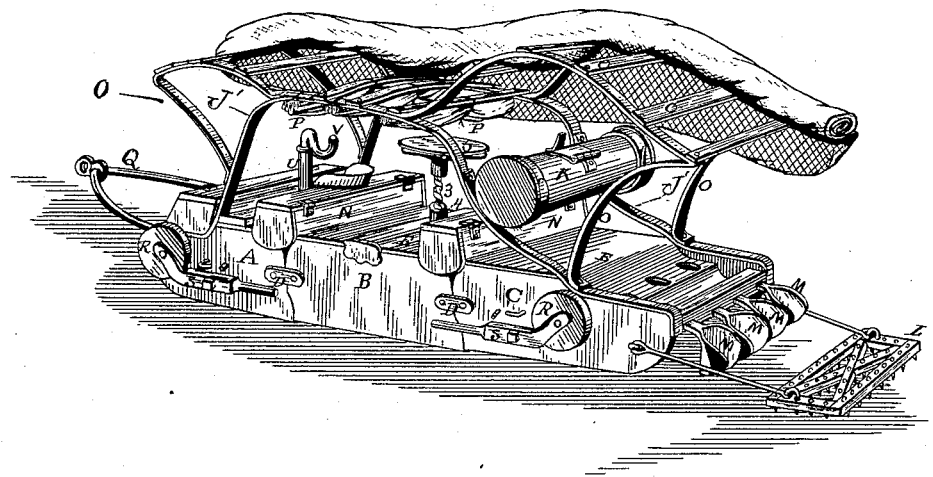
Figure 2:
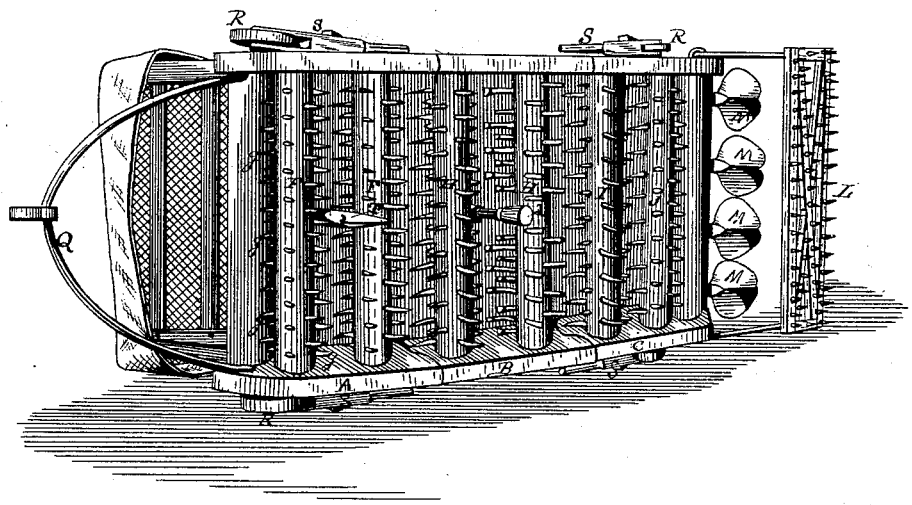

Referring to the accompanying drawings, Figure 1 represents a perspective view of my machine; Fig. 2, a bottom view of the same. Fig. 3 presents a view of one of the two springs that hold the seeder. Fig. 4 is a short digging-tooth. Fig. 5 is a spade-shaped tooth of the subsoiler. Fig. 6 is a detailed view of a section of my machine.

The body of the machine is made of two or more short sections A B C, which are hinged together, so that they can rise and fall independent of each other, thus forming a flexible frame-work which will accommodate itself to the inequalities of the surface over which it moves. To do this the side-boards of each section have their ends cut rounding, and they are connected by links D, which extend across from one to the other and are pivoted at each end to each side-board; or they can be made to lap on each other and the overlapped ends be united by a rivet or bolt, so as to form hinge-joints, as shown at Fig. 6. Each section is covered with a floor E, as shown. The front ends of the side-boards of the first section are rounded like a sled, so that they will pass readily over the ground.

Two rollers F are mounted between the side-boards of the first section, and these rollers are provided with digging-teeth $g$ $g$, which may be longer or shorter, as desired; but I prefer to make them about seven inches long. The second section B has two similar rollers H mounted in it, with teeth similar to those on rollers F, except that they are one or two inches longer, so that they penetrate deeper than the first set of teeth. The third section C has a similar roller I mounted in it, and this roller has spade-shaped teeth $g'$ attached to a shank (shown at Fig. 5) instead of spikes or digging-teeth. These spade-shaped teeth enter the soil as far as the teeth of the roller just preceding it, and they take the bottom soil and raise it to the surface, thus performing the office of subsoiling. To the rear of roller I is located a similar roller J, which is provided with short pulverizing-teeth, which enter the loose soil already plowed and subsoiled and reduce any clods or large pieces, so that the ground is prepared for the reception of grain or seed. The upper edges of the sections A and C, on each side, have secured thereto the ends of approximately inverted-U-shaped pieces or supports $J'$ $J'$.

A seed-planter K is mounted on the U-shaped pieces or supports of the machine, near its rear end, in which the seed or sets to be planted are contained. The drum or cylinder which contains the seeds is mounted on springs $K'$, so that the motion of the machine will cause it to feed the grain out through perforations in its bottom, whence it falls upon the prepared soil. These springs consist of a series of leaves, of which three are shown in the drawings, each successive leaf being longer than the one beneath, and the upper leaf has its end bent into a complete circle, the end thereof passing through a sleeve $K^2$. The other portions of the springs or supporting-pieces (indicated by the letters $K^3$ $K^3$) are provided with upper curved portions, which pass beneath the several layers, and thus act as a support therefor. The ends of the seed-planter K have their bearings in these circular springs, which, being constructed as described, permit of considerable yielding, and at the same time are greatly strengthened or re-enforced by the several layers which compose the same.

A trailing harrow L is attached to the rear end of the machine, which covers the grain after it has been sowed.

If it is desired to drill the grain or plant it in hills, I attach to the rear end of the machine furrow-plates M M M. These furrow-plates are made of metal, which is cast or bent to the form of a V, with their upper edges bent downward, as shown, so that as they are dragged through the loose soil they will force it outward and leave a furrow behind. In this furrow seeds or roots of plants may be deposited from the seeder or planter on the machine, and the trailing harrow L will cover them and level the ground.

N N are hampers or chests, which are secured upon the machine, and in which seeds, tools, cooking utensils, provisions, &c., can be carried.

A strong frame-work O, which is preferably made of metal, is mounted upon and over the machine, over which a canvas or other cover can be thrown, thus converting the top of the machine, into a tent or living-house. This frame O consists of vertical and curved end pieces, having the outer ends of horizontal and upwardly-curved pieces connected thereto, the inner ends of said horizontal pieces being connected to the side pieces J'. This cover can be removed when desired.

P P P are hammocks swung in the frame-work O, in which the workmen can sleep at night.

This machine can be drawn over the ground by horses or by a steam traction-engine. A bail Q is attached to the front section A, to which the traction-power is applied.

A steering-rudder T is mounted below the machine and is operated through an upright shaft U and hand-lever V from the floor of the machine, so that a person sitting on the machine can by simply turning the rudder cause the machine to be guided to the right or the left. The rudder is a simple blade that impinges against the soil in the ordinary manner of operating the rudders.

Wheels R R are mounted on cranked axles S on each side of the machine, so that when desired they can be lowered and fixed so as to support and carry the machine far enough above the ground to prevent its digging-teeth from coming in contact with the ground; but when it is desired to use the machine for actual work the wheels are raised, so as to lower the sled-runners or side-boards to the ground, in which position the teeth will enter the ground, as above described.

A lifting device, consisting of a presser-foot 2, has a screw-spindle 3 passing up through a threaded bearing 4 in the floor of the machine, and on the upper end of the spindle is a hand-wheel 5, by turning which the presser-foot is raised or lowered. By forcing this presser-foot down against the ground the machine is raised, so that the cranked axles can be lowered, and thus when the presser-foot is raised again the weight of the machine is transferred to the rollers. In this condition the machine can be moved from place to place without bringing its digging and working parts in contact with the ground. When it is desired to set it at work, the presser-foot is again brought into use to raise the machine and allow the bearing-wheels to be thrown into the position shown at Fig. 1.

Having thus described my invention, what I claim, and desire to secure by Letters Patent, is—

1. A combined sectional digging, subsoiling, pulverizing, planting, and harrowing machine, consisting of sections A B C, flexibly connected together and having the rollers F H I J mounted across them, with their graduated digging, subsoiling, and pulverizing teeth, the seeder K, mounted upon the machine, and the furrow-turners M M M and the trailing harrow L, all combined and arranged to operate substantially as above described.

2. In a combined sectional subsoiling, pulverizing, planting, and harrowing machine, the rotatable cranked axles S, with their bearing-wheels R, in combination with the presser-foot 2, screw-spindle 3, threaded bearing 4, and hand-wheel 5, substantially as described.

3. In a farming-machine, the combination of inverted-U-shaped side pieces and springs secured thereto, said springs consisting of two sections, one section being composed of a series of layers of leaves gradually increasing in length, the upper one thereof bent so as to form a complete circle, and the other section consisting of a supporting-spring having its upper bent end passing beneath the leaves, in combination with a seed-planter having its ends mounted in the circles formed by the springs, substantially as set forth.

4. In a farming-machine, the combination, with the frame thereof, of a presser-foot extending beneath the frame, a screw-spindle, a threaded bearing into which said screw-spindle works, and a hand-wheel mounted upon the upper end of said screw-spindle, substantially as set forth.

5. In a farming-machine, the combination, with the frame thereof, of inverted-U-shaped side pieces, vertical and curved uprights extending from said side pieces, horizontal and upwardly-curved pieces having their outer ends connected to the uprights and their inner ends connected to the inverted-U-shaped side pieces, and cross-slats, the several connected pieces forming a support for a cover, substantially as set forth.

In witness whereof I have hereunto set my hand.

JOHANNES MORITZ HERING.

Witnesses:
 M. G. LOEFLER,
 J. A. VAUGHAN.